Feb. 19, 1924.  
G. BOYDELATOUR  
1,484,466  
LOCK FOR DIFFERENTIAL GEARS  
Filed Aug. 9, 1923
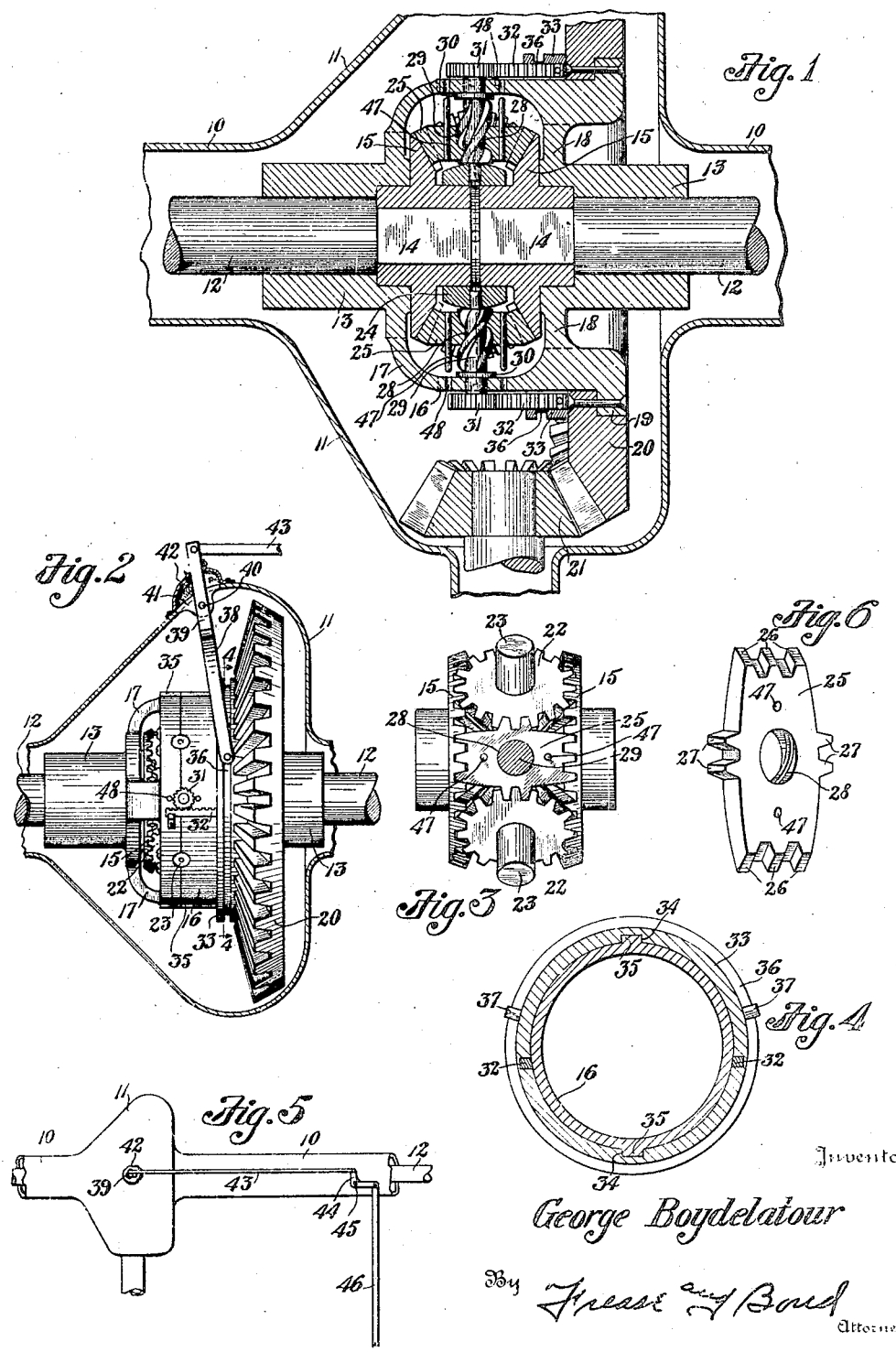
Inventor  
George Boydelatour  
By Frease and Bond  
Attorneys Patented Feb. 19, 1924.

1,484,466

UNITED STATES PATENT OFFICE.

GEORGE BOYDELATOUR, OF CANTON, OHIO.

LOCK FOR DIFFERENTIAL GEARS.

Application filed August 9, 1923. Serial No. 656,585.

*To all whom it may concern:*

Be it known that I, GEORGE BOYDELATOUR, a citizen of the United States, residing at Canton, in the county of Stark and State of Ohio, have invented certain new and useful Improvements in Locks for Differential Gears, of which the following is a specification.

The invention relates to improvements in differential gear mechanism for self propelled vehicles, and the object of the improvement is to provide means for locking the differential gears to cause the two live axle sections to rotate as a unit; means being provided for operating the locking mechanism from a point convenient to the driver's seat.

The above and other objects are attained by constructing the mechanism in the manner illustrated in the accompanying drawing, in which—

Figure 1 is a plan sectional view through a differential gear mechanism embodying the invention;

Fig. 2, a side elevation of the differential gear mechanism, the housing being shown in section;

Fig. 3, an elevation of the differential gears and lock with the housing and frame removed;

Fig. 4, a section on the line 4—4, Fig. 2;

Fig. 5, a plan view of a portion of the differential housing showing the means for operating the lock; and Fig. 6, a detached, perspective view of the lock.

Similar numerals refer to similar parts throughout the drawing.

The usual rear axle housing is indicated at 10 and the differential housing at 11. The live axles 12 are extended through the axle housing and through the bearings 13 in the differential housing, having the squared inner ends 14 upon which are fixed the beveled gears 15 of the differential mechanism.

An annular frame 16 is connected to the bearings 13 as by the radial arms 17 and 18 and is provided with an annular flange 19 at one edge, to which is attached the beveled drive gear 20 of the differential mechanism, said drive gear meshing with the drive pinion 21.

The beveled pinions 22 are provided with stub shafts 23 journaled in the annular frame 16 and each of said pinions meshes with both of the beveled gears 15. The inner ends of the shafts 23 of the beveled pinions are journaled in the ring 24 which, together with the annular frame 16 and radial arms 17 and 18, forms the driving cage of the differential mechanism.

This much of the mechanism may be of usual construction, the invention residing in the locking mechanism which includes the locking dogs 25, each of which is provided with the teeth 26 at its ends arranged to mesh with the teeth of the beveled gears 15, and the teeth 27 at its sides arranged to mesh with the teeth of the beveled pinions 22.

Each of the locking dogs is provided with the central threaded opening 28 mounted upon the screw 29 which is journaled at its inner end in the ring 24, the outer end being extended through the annular portion 16 of the cage, the collar 30 preventing longitudinal movement of the same.

A pinion 31 is mounted upon the outer end of each screw and meshes with a rack bar 32, the rack bars being connected to the sliding ring 33 which is mounted around the annular portion 16 of the cage. The ring 33 is provided with grooves 34 which engage the ribs 35 upon the annular portion 16 of the cage to prevent turning of the ring upon the cage.

The ring 33 is provided with an annular groove 36 which receives the studs 37 upon the yoke 38, the lever 39 being fixed to said yoke and pivoted as at 40 adjacent to a slot 41 in the differential housing, a dust cap 42 being provided over said slot.

A link 43 is connected to the outer end of the lever 39 and at its opposite end to a bell crank 44, which is pivoted as at 45 to a stationary portion of the vehicle, a link 46 leading from said bell crank to a suitable lever or pedal located adjacent to the driver's seat.

Each of the locking dogs is provided with the pins 47 arranged to enter the apertures 48 in the cage when the locking dogs are in the unlocked position, these pins being for the purpose of holding the dogs in alignment in order that they will mesh properly with the gears.

In operating the vehicle, the dogs are normally held in the unlocked position, being withdrawn from engagement with the beveled gears and pinion. When it is desired to lock the two sections of the axle together, the lever 39 is operated through the links and bell crank above described, sliding the ring 33 upon the annular portion 16 of the cage, the rack bars 32 rotating the pinions 31 and through said pinions the screws 29, moving the locking dogs into mesh with the gears 15 and pinions 22, as shown in Fig. 3.

It will be seen that each locking dog locks both of the gears 15 and two of the pinions 22 thus locking both sections of the axle together and causing them to rotate as a unit.

It will be obvious that the movement of the ring 33 in the opposite direction will, through the rack bars 22, rotate the pinions 31, and with them the screws 29 in a direction to withdraw the locking dogs from engagement with the differential gearing, thus permitting the gearing to operate in the usual manner.

I claim:—

1. The combination with a differential gearing including gears and pinions meshing with the gears, of a locking dog arranged to mesh with both gears and with two of the pinions.

2. The combination with a differential gearing including gears and pinions meshing with the gears, of a locking dog arranged to mesh with both gears and with two of the pinions, and means for moving the locking dog into engagement with the gearing.

3. The combination with a differential gearing including gears and pinions meshing with the gears, of a locking dog arranged to mesh with both gears and with two of the pinions, and a screw for moving the locking dog into engagement with the gearing.

4. The combination with a differential gearing including gears and pinions meshing with the gears, of a locking dog having teeth at its ends for engagement with the gears and teeth at its sides for engagement with two of the pinions.

5. The combination with a differential gearing including gears and pinions meshing with the gears, of a locking dog having teeth at its ends for engagement with the gears and teeth at its sides for engagement with two of the pinions, and means for moving the locking dog into engagement with the gearing.

6. The combination with a differential gearing including gears and pinions meshing with the gears, of a locking dog having teeth at its ends for engagement with the gears and teeth at its sides for engagement with two of the pinions, and a screw for moving the locking dog into engagement with the gearing.

7. The combination with a differential gearing including gears and pinions meshing with the gears, of a locking dog arranged to mesh with both gears and with two of the pinions, a screw for moving the locking dog into engagement with the gearing, a pinion upon the screw, a rack bar engaging the pinion and means for sliding the rack bar.

8. The combination with a differential gearing including gears and pinions meshing with the gears, of a locking dog arranged to mesh with both gears and with two of the pinions, a screw for moving the locking dog into engagement with the gearing, a pinion upon the screw, a ring upon which the rack bar is fixed, and means for sliding the ring.

In testimony that I claim the above, I have hereunto subscribed my name.

GEORGE BOYDELATOUR.